(12) United States Patent
Yin et al.

(10) Patent No.: US 8,652,992 B2
(45) Date of Patent: Feb. 18, 2014

(54) PINNING AND AFFIXING NANO-ACTIVE MATERIAL

(75) Inventors: Qinghua Yin, Tempe, AZ (US); Xiwang Qi, Scottsdale, AZ (US); Eliseo Ruiz, Queen Creek, AZ (US)

(73) Assignee: SDCmaterials, Inc., Tempe, AZ (US)

( * ) Notice: Subject to any disclaimer, the term of this patent is extended or adjusted under 35 U.S.C. 154(b) by 71 days.

(21) Appl. No.: 12/962,473

(22) Filed: Dec. 7, 2010

(65) Prior Publication Data

US 2011/0143915 A1    Jun. 16, 2011

Related U.S. Application Data

(60) Provisional application No. 61/284,329, filed on Dec. 15, 2009.

(51) Int. Cl.
  *B01J 23/00* (2006.01)
(52) U.S. Cl.
  USPC ............. 502/325; 502/5; 502/339; 502/330; 977/840
(58) Field of Classification Search
  USPC ..................................... 502/5, 339
  See application file for complete search history.

(56) References Cited

U.S. PATENT DOCUMENTS

| | | |
|---|---|---|
| 2,284,554 A | 5/1942 | Beyerstedt |
| 2,419,042 A | 4/1947 | Todd .................. 202/205 |
| 2,519,531 A | 8/1950 | Worn ................... 230/95 |
| 2,562,753 A | 7/1951 | Trost ................... 241/39 |
| 2,689,780 A | 9/1954 | Rice .................... 23/106 |
| 3,001,402 A | 9/1961 | Koblin ................. 73/421.5 |
| 3,042,511 A | 7/1962 | Reding, Jr. |
| 3,067,025 A | 12/1962 | Chisholm ............... 75/84.5 |
| 3,145,287 A | 8/1964 | Siebein et al. |

(Continued)

FOREIGN PATENT DOCUMENTS

| | | |
|---|---|---|
| EP | 1 619 168 A1 | 1/2006 |
| GB | 1 307 941 A | 2/1973 |

(Continued)

OTHER PUBLICATIONS

Stiles, A.B., Catalyst Supports and Supported Catalysts, Manufacture of Carbon-Supported Metal Catalysts, pp. 125-132, published Jan. 1, 1987, Butterworth Publishers, 80 Montvale Ave., Stoneham, MA 02180.

(Continued)

*Primary Examiner* — Colleen Dunn
*Assistant Examiner* — Haytham Soliman
(74) *Attorney, Agent, or Firm* — Morrison & Foerster LLP

(57) ABSTRACT

A nanoparticle comprises a nano-active material and a nano-support. In some embodiments, the nano-active material is platinum and the nano-support is alumina. Pinning and affixing the nano-active material to the nano-support is achieved by using a high temperature condensation technology. In some embodiments, the high temperature condensation technology is plasma. Typically, a quantity of platinum and a quantity of alumina are loaded into a plasma gun. When the nano-active material bonds with the nano-support, an interface between the nano-active material and the nano-support forms. The interface is a platinum alumina metallic compound, which dramatically changes an ability for the nano-active material to move around on the surface of the nano-support, providing a better bond than that of a wet catalyst. Alternatively, a quantity of carbon is also loaded into the plasma gun. When the nano-active material bonds with the nano-support, the interface formed comprises a platinum copper intermetallic compound, which provides an even stronger bond.

18 Claims, 5 Drawing Sheets

(56) References Cited

U.S. PATENT DOCUMENTS

| | | | |
|---|---|---|---|
| 3,178,121 A | 4/1965 | Wallace, Jr. ............... 241/5 |
| 3,179,782 A | 4/1965 | Matvay |
| 3,181,947 A | 5/1965 | Vordahl |
| 3,313,908 A | 4/1967 | Unger et al. |
| 3,401,465 A | 9/1968 | Larwill ............... 34/57 |
| 3,450,926 A | 6/1969 | Kiernan |
| 3,457,788 A | 7/1969 | Nobuo Miyajima ............ 73/422 |
| 3,537,513 A | 11/1970 | Austin ............... 165/70 |
| 3,552,653 A | 1/1971 | Inoue |
| 3,617,358 A | 11/1971 | Dittrich |
| 3,667,111 A | 6/1972 | Chartet |
| 3,741,001 A | 6/1973 | Fletcher et al. ............... 73/28 |
| 3,752,172 A | 8/1973 | Cohen et al. ............... 137/12 |
| 3,761,360 A | 9/1973 | Auvil et al. |
| 3,774,442 A | 11/1973 | Gustavsson ............... 73/28 |
| 3,804,034 A | 4/1974 | Stiglich, Jr. |
| 3,830,756 A | 8/1974 | Sanchez et al. ............... 252/462 |
| 3,871,448 A | 3/1975 | Vann et al. |
| 3,892,882 A | 7/1975 | Guest et al. ............... 427/34 |
| 3,914,573 A | 10/1975 | Muehlberger ............... 219/76 |
| 3,959,094 A | 5/1976 | Steinberg |
| 3,959,420 A | 5/1976 | Geddes et al. ............... 261/112 |
| 3,969,482 A | 7/1976 | Teller |
| 4,008,620 A | 2/1977 | Narato et al. ............... 73/421.5 A |
| 4,018,388 A | 4/1977 | Andrews ............... 241/39 |
| 4,021,021 A | 5/1977 | Hall et al. |
| 4,139,497 A | 2/1979 | Castor et al. ............... 252/470 |
| 4,157,316 A | 6/1979 | Thompson et al. ............ 252/462 |
| 4,171,288 A | 10/1979 | Keith et al. ............... 252/462 |
| 4,174,298 A | 11/1979 | Antos ............... 252/441 |
| 4,227,928 A | 10/1980 | Wang |
| 4,248,387 A | 2/1981 | Andrews ............... 241/5 |
| 4,253,917 A | 3/1981 | Wang |
| 4,260,649 A | 4/1981 | Dension et al. |
| 4,284,609 A | 8/1981 | deVries ............... 423/242 |
| 4,344,779 A | 8/1982 | Isserlis |
| 4,369,167 A | 1/1983 | Weir |
| 4,388,274 A | 6/1983 | Rourke et al. ............... 422/177 |
| 4,419,331 A | 12/1983 | Montalvo |
| 4,431,750 A | 2/1984 | McGinnis et al. ............ 502/329 |
| 4,436,075 A | 3/1984 | Campbell et al. ............ 123/557 |
| 4,440,733 A | 4/1984 | Lawson et al. |
| 4,458,138 A | 7/1984 | Adrian et al. |
| 4,459,327 A | 7/1984 | Wang |
| 4,505,945 A | 3/1985 | Dubust et al. |
| 4,513,149 A | 4/1985 | Gray et al. ............... 564/449 |
| RE32,244 E | 9/1986 | Andersen |
| 4,609,441 A | 9/1986 | Frese, Jr. et al. |
| 4,723,589 A | 2/1988 | Iyer et al. |
| 4,731,517 A | 3/1988 | Cheney |
| 4,764,283 A | 8/1988 | Ashbrook et al. ............ 210/695 |
| 4,765,805 A | 8/1988 | Wahl et al. |
| 4,824,624 A | 4/1989 | Palicka et al. ............... 264/67 |
| 4,836,084 A | 6/1989 | Vogelesang et al. |
| 4,855,505 A | 8/1989 | Koll ............... 564/398 |
| 4,866,240 A | 9/1989 | Webber ............... 219/121.47 |
| 4,885,038 A | 12/1989 | Anderson et al. |
| 4,921,586 A | 5/1990 | Molter |
| 4,983,555 A | 1/1991 | Roy et al. ............... 501/120 |
| 4,987,033 A | 1/1991 | Abkowitz et al. ............ 428/469 |
| 5,006,163 A | 4/1991 | Benn et al. |
| 5,015,863 A | 5/1991 | Takeshima et al. |
| 5,041,713 A | 8/1991 | Weidman ............... 219/121.51 |
| 5,043,548 A | 8/1991 | Whitney et al. ............ 219/121.84 |
| 5,070,064 A | 12/1991 | Hsu et al. |
| 5,073,193 A | 12/1991 | Chaklader et al. ............ 75/346 |
| 5,133,190 A | 7/1992 | Abdelmalek |
| 5,151,296 A | 9/1992 | Tokunaga |
| 5,157,007 A | 10/1992 | Domesle et al. ............... 502/66 |
| 5,230,844 A | 7/1993 | Macaire et al. |
| 5,233,153 A | 8/1993 | Coats |
| 5,269,848 A | 12/1993 | Nakagawa |
| 5,338,716 A | 8/1994 | Triplett et al. |
| 5,369,241 A | 11/1994 | Taylor et al. ............ 219/121.47 |
| 5,371,049 A | 12/1994 | Moffett et al. ............... 501/89 |
| 5,372,629 A | 12/1994 | Anderson et al. ............... 75/332 |
| 5,392,797 A | 2/1995 | Welch ............... 134/108 |
| 5,436,080 A | 7/1995 | Inoue et al. |
| 5,439,865 A | 8/1995 | Abe et al. ............... 502/333 |
| 5,442,153 A | 8/1995 | Marantz et al. ............ 219/121.47 |
| 5,460,701 A | 10/1995 | Parker et al. |
| 5,464,458 A | 11/1995 | Yamamoto |
| 5,485,941 A | 1/1996 | Guyomard et al. ............... 222/1 |
| 5,534,149 A | 7/1996 | Birkenbeil et al. ............ 210/636 |
| 5,553,507 A | 9/1996 | Basch et al. ............... 73/863.01 |
| 5,562,966 A | 10/1996 | Clarke et al. |
| 5,582,807 A | 12/1996 | Liao et al. |
| 5,611,896 A | 3/1997 | Swanepoel et al. ............ 204/169 |
| 5,630,322 A | 5/1997 | Heilmann et al. ............ 62/95 |
| 5,652,304 A | 7/1997 | Calderon et al. |
| 5,714,644 A | 2/1998 | Irgang et al. |
| 5,723,187 A | 3/1998 | Popoola et al. |
| 5,726,414 A | 3/1998 | Kitahashi et al. |
| 5,749,938 A | 5/1998 | Coombs ............... 75/332 |
| 5,776,359 A | 7/1998 | Schultz et al. ............ 252/62.51 |
| 5,788,738 A | 8/1998 | Pirzada et al. ............... 75/331 |
| 5,811,187 A | 9/1998 | Anderson et al. ............ 428/403 |
| 5,837,959 A | 11/1998 | Muehlberger et al. ... 219/121.47 |
| 5,851,507 A | 12/1998 | Pirzada et al. ............... 423/659 |
| 5,853,815 A | 12/1998 | Muehlberger ............... 427/446 |
| 5,858,470 A | 1/1999 | Bernecki et al. |
| 5,905,000 A | 5/1999 | Yadav et al. ............... 429/33 |
| 5,928,806 A | 7/1999 | Olah et al. |
| 5,935,293 A | 8/1999 | Detering et al. ............ 75/10.29 |
| 5,973,289 A | 10/1999 | Read et al. |
| 5,989,648 A | 11/1999 | Phillips ............... 427/456 |
| 5,993,967 A | 11/1999 | Brotzman, Jr. et al. ............ 428/407 |
| 5,993,988 A | 11/1999 | Ohara et al. ............... 429/40 |
| 6,004,620 A | 12/1999 | Camm |
| 6,012,647 A | 1/2000 | Ruta et al. ............... 239/132.1 |
| 6,033,781 A | 3/2000 | Brotzman, Jr. et al. ............ 428/405 |
| 6,045,765 A | 4/2000 | Nakatsuji et al. |
| 6,059,853 A | 5/2000 | Coombs ............... 75/332 |
| 6,084,197 A | 7/2000 | Fusaro, Jr. |
| 6,093,306 A | 7/2000 | Hanrahan et al. |
| 6,102,106 A | 8/2000 | Manning et al. ............ 165/76 |
| 6,117,376 A | 9/2000 | Merkel |
| 6,213,049 B1 | 4/2001 | Yang ............... 118/723 |
| 6,214,195 B1 | 4/2001 | Yadav et al. ............... 205/334 |
| 6,228,904 B1 | 5/2001 | Yadav et al. ............... 523/210 |
| 6,254,940 B1 | 7/2001 | Pratsinis et al. ............ 427/562 |
| 6,261,484 B1 | 7/2001 | Phillips et al. ............... 264/5 |
| 6,267,864 B1 | 7/2001 | Yadav et al. ............... 205/341 |
| 6,322,756 B1 | 11/2001 | Arno et al. |
| 6,342,465 B1 | 1/2002 | Klein et al. ............... 502/339 |
| 6,344,271 B1 | 2/2002 | Yadav et al. ............... 428/402 |
| 6,379,419 B1 | 4/2002 | Celik et al. ............... 75/346 |
| 6,387,560 B1 | 5/2002 | Yadav et al. ............... 429/45 |
| 6,395,214 B1 | 5/2002 | Kear et al. ............... 264/434 |
| 6,398,843 B1 | 6/2002 | Tarrant ............... 75/249 |
| 6,409,851 B1 | 6/2002 | Sethuram et al. ............ 148/565 |
| 6,413,781 B1 | 7/2002 | Geis et al. ............... 436/178 |
| 6,416,818 B1 | 7/2002 | Aikens et al. ............ 427/383.1 |
| RE37,853 E | 9/2002 | Detering et al. ............ 75/10.19 |
| 6,444,009 B1 | 9/2002 | Liu et al. ............... 75/332 |
| 6,475,951 B1 | 11/2002 | Domesle et al. |
| 6,506,995 B1 | 1/2003 | Fusaro, Jr. et al. |
| 6,517,800 B1 | 2/2003 | Cheng et al. ............... 423/447.1 |
| 6,524,662 B2 | 2/2003 | Jang et al. ............... 427/535 |
| 6,531,704 B2 | 3/2003 | Yadav et al. ............... 250/493.1 |
| 6,548,445 B1 | 4/2003 | Buysch et al. ............ 502/230 |
| 6,554,609 B2 | 4/2003 | Yadav et al. ............... 432/9 |
| 6,562,304 B1 | 5/2003 | Mizrahi |
| 6,562,495 B2 | 5/2003 | Yadav et al. ............... 429/12 |
| 6,569,397 B1 | 5/2003 | Yadav et al. ............... 423/345 |
| 6,569,518 B2 | 5/2003 | Yadav et al. ............... 428/323 |
| 6,572,672 B2 | 6/2003 | Yadav et al. ............... 75/343 |
| 6,579,446 B1 | 6/2003 | Teran et al. |
| 6,596,187 B2 | 7/2003 | Coll et al. ............... 216/56 |
| 6,603,038 B1 | 8/2003 | Hagemeyer et al. ............ 560/241.1 |
| 6,607,821 B2 | 8/2003 | Yadav et al. ............... 428/323 |
| 6,610,355 B2 | 8/2003 | Yadav et al. ............... 427/115 |
| 6,623,559 B2 | 9/2003 | Huang ............... 117/87 |
| 6,635,357 B2 | 10/2003 | Moxson et al. ............ 428/548 |

(56) References Cited

U.S. PATENT DOCUMENTS

| | | | |
|---|---|---|---|
| 6,641,775 B2 | 11/2003 | Vigliotti et al. ............... 264/618 |
| 6,652,822 B2 | 11/2003 | Phillips et al. ............... 423/290 |
| 6,652,967 B2 | 11/2003 | Yadav et al. ................ 428/403 |
| 6,669,823 B1 | 12/2003 | Sarkas et al. ................ 204/164 |
| 6,682,002 B2 | 1/2004 | Kyotani ....................... 239/318 |
| 6,689,192 B1 | 2/2004 | Phillips et al. ................ 75/342 |
| 6,699,398 B1 | 3/2004 | Kim .............................. 216/55 |
| 6,706,097 B2 | 3/2004 | Zornes ........................... 96/153 |
| 6,706,660 B2 | 3/2004 | Park |
| 6,710,207 B2 | 3/2004 | Bogan, Jr. et al. ............ 562/549 |
| 6,713,176 B2 | 3/2004 | Yadav et al. ................ 428/402 |
| 6,716,525 B1 | 4/2004 | Yadav et al. ................ 428/402 |
| 6,744,006 B2 | 6/2004 | Johnson et al. |
| 6,746,791 B2 | 6/2004 | Yadav et al. ................. 429/30 |
| 6,772,584 B2 | 8/2004 | Chun et al. ..................... 60/275 |
| 6,786,950 B2 | 9/2004 | Yadav et al. ................. 75/346 |
| 6,813,931 B2 | 11/2004 | Yadav et al. ................ 73/31.05 |
| 6,817,388 B2 | 11/2004 | Tsangaris et al. ............. 141/82 |
| 6,832,735 B2 | 12/2004 | Yadav et al. .................. 241/16 |
| 6,838,072 B1 | 1/2005 | Kong et al. ................ 423/594.2 |
| 6,841,509 B1 | 1/2005 | Hwang et al. |
| 6,855,410 B2 | 2/2005 | Buckley |
| 6,855,426 B2 | 2/2005 | Yadav ........................ 428/403 |
| 6,855,749 B1 | 2/2005 | Yadav et al. ................ 523/105 |
| 6,886,545 B1 | 5/2005 | Holm ....................... 123/568.21 |
| 6,896,958 B1 | 5/2005 | Cayton et al. ................ 428/323 |
| 6,902,699 B2 | 6/2005 | Fritzemeier et al. ........... 419/38 |
| 6,916,872 B2 | 7/2005 | Yadav et al. ................ 524/430 |
| 6,919,065 B2 | 7/2005 | Zhou et al. |
| 6,919,527 B2 | 7/2005 | Boulos et al. ............. 219/121.52 |
| 6,933,331 B2 | 8/2005 | Yadav et al. ................ 523/210 |
| 6,972,115 B1 | 12/2005 | Ballard |
| 6,986,877 B2 | 1/2006 | Takikawa et al. ........... 423/447.3 |
| 6,994,837 B2 | 2/2006 | Boulos et al. ................ 423/613 |
| 7,007,872 B2 | 3/2006 | Yadav et al. ..................... 241/1 |
| 7,022,305 B2 | 4/2006 | Drumm et al. |
| 7,052,777 B2 | 5/2006 | Brotzman, Jr. et al. ....... 428/570 |
| 7,073,559 B2 | 7/2006 | O'Larey et al. .............. 164/76.1 |
| 7,081,267 B2 | 7/2006 | Yadav ........................... 427/115 |
| 7,101,819 B2 | 9/2006 | Rosenflanz et al. ............ 501/10 |
| 7,147,544 B2 | 12/2006 | Rosenflanz ..................... 451/28 |
| 7,147,894 B2 | 12/2006 | Zhou et al. .................... 427/256 |
| 7,166,198 B2 | 1/2007 | Van Der Walt et al. ....... 204/165 |
| 7,166,663 B2 | 1/2007 | Cayton et al. ................ 524/430 |
| 7,172,649 B2 | 2/2007 | Conrad et al. .................. 106/35 |
| 7,172,790 B2 | 2/2007 | Koulik et al. |
| 7,178,747 B2 | 2/2007 | Yadav et al. ................... 241/23 |
| 7,208,126 B2 | 4/2007 | Musick et al. ................. 423/69 |
| 7,211,236 B2 | 5/2007 | Stark et al. ................ 423/592.1 |
| 7,217,407 B2 | 5/2007 | Zhang ........................ 423/610 |
| 7,220,398 B2 | 5/2007 | Sutorik et al. .............. 423/593.1 |
| 7,255,498 B2 | 8/2007 | Bush et al. |
| 7,265,076 B2 | 9/2007 | Taguchi et al. |
| 7,307,195 B2 | 12/2007 | Polverejan et al. ............ 585/443 |
| 7,323,655 B2 | 1/2008 | Kim ......................... 219/121.43 |
| 7,384,447 B2 | 6/2008 | Kodas et al. ................... 75/332 |
| 7,402,899 B1 | 7/2008 | Whiting et al. |
| 7,417,008 B2 | 8/2008 | Richards et al. .............. 502/306 |
| 7,494,527 B2 | 2/2009 | Jurewicz et al. ................ 75/346 |
| 7,517,826 B2 | 4/2009 | Fujdala et al. |
| 7,534,738 B2 | 5/2009 | Fujdala et al. |
| 7,541,012 B2 | 6/2009 | Yeung et al. ............... 423/245.1 |
| 7,541,310 B2 | 6/2009 | Espinoza et al. |
| 7,557,324 B2 | 7/2009 | Nylen et al. |
| 7,572,315 B2 | 8/2009 | Boulos et al. .................. 75/336 |
| 7,611,686 B2 | 11/2009 | Alekseeva et al. ............ 423/276 |
| 7,615,097 B2 | 11/2009 | McKechnie et al. ............ 75/346 |
| 7,618,919 B2 | 11/2009 | Shimazu et al. |
| 7,622,693 B2 | 11/2009 | Foret ........................ 219/121.43 |
| 7,632,775 B2 | 12/2009 | Zhou et al. |
| 7,674,744 B2 | 3/2010 | Shiratori et al. |
| 7,678,419 B2 | 3/2010 | Kevwitch et al. |
| 7,709,411 B2 | 5/2010 | Zhou et al. |
| 7,709,414 B2 | 5/2010 | Fujdala et al. |
| 7,745,367 B2 | 6/2010 | Fujdala et al. |
| 7,750,265 B2 | 7/2010 | Belashchenko et al. |
| 7,803,210 B2 | 9/2010 | Sekine et al. |
| 7,851,405 B2 | 12/2010 | Wakamatsu et al. |
| 7,874,239 B2 | 1/2011 | Howland |
| 7,897,127 B2 | 3/2011 | Layman et al. |
| 7,902,104 B2 | 3/2011 | Kalck |
| 7,905,942 B1 | 3/2011 | Layman |
| 7,935,655 B2 | 5/2011 | Tolmachev |
| 8,051,724 B1 | 11/2011 | Layman et al. |
| 8,076,258 B1 | 12/2011 | Biberger |
| 8,080,494 B2 | 12/2011 | Yasuda et al. |
| 8,089,495 B2 | 1/2012 | Keller |
| 8,142,619 B2 | 3/2012 | Layman et al. |
| 8,168,561 B2 | 5/2012 | Virkar |
| 8,173,572 B2 | 5/2012 | Feaviour |
| 8,258,070 B2 | 9/2012 | Fujdala et al. |
| 8,278,240 B2 | 10/2012 | Tange et al. |
| 8,294,060 B2 | 10/2012 | Mohanty et al. |
| 8,309,489 B2 | 11/2012 | Cuenya et al. |
| 8,349,761 B2 | 1/2013 | Xia et al. |
| 2001/0004009 A1 | 6/2001 | MacKelvie |
| 2001/0042802 A1 | 11/2001 | Youds ............................... 241/5 |
| 2002/0018815 A1 | 2/2002 | Sievers et al. ................. 424/489 |
| 2002/0068026 A1 | 6/2002 | Murrell et al. ................ 422/211 |
| 2002/0079620 A1 | 6/2002 | DuBuis et al. ........... 264/328.14 |
| 2002/0100751 A1 | 8/2002 | Carr |
| 2002/0102674 A1 | 8/2002 | Anderson ..................... 435/174 |
| 2002/0131914 A1 | 9/2002 | Sung |
| 2002/0143417 A1 | 10/2002 | Ito et al. .......................... 700/95 |
| 2002/0182735 A1 | 12/2002 | Kibby et al. .................... 436/37 |
| 2002/0183191 A1 | 12/2002 | Faber et al. |
| 2002/0192129 A1 | 12/2002 | Shamouilian et al. |
| 2003/0036786 A1 | 2/2003 | Duren et al. .................... 607/96 |
| 2003/0042232 A1 | 3/2003 | Shimazu ................... 219/121.47 |
| 2003/0047617 A1 | 3/2003 | Shanmugham et al. |
| 2003/0066800 A1 | 4/2003 | Saim et al. ........................ 264/5 |
| 2003/0108459 A1 | 6/2003 | Wu et al. .................. 422/186.04 |
| 2003/0110931 A1 | 6/2003 | Aghajanian et al. |
| 2003/0139288 A1 | 7/2003 | Cai et al. ....................... 502/303 |
| 2003/0143153 A1 | 7/2003 | Boulos et al. |
| 2003/0172772 A1 | 9/2003 | Sethuram et al. ............... 501/87 |
| 2003/0223546 A1 | 12/2003 | McGregor et al. ............ 378/143 |
| 2004/0009118 A1 | 1/2004 | Phillips et al. .............. 423/592.1 |
| 2004/0023302 A1 | 2/2004 | Archibald et al. ............. 435/7.1 |
| 2004/0023453 A1 | 2/2004 | Xu et al. ...................... 257/369 |
| 2004/0077494 A1 | 4/2004 | LaBarge et al. ............... 502/303 |
| 2004/0103751 A1 | 6/2004 | Joseph et al. ................ 75/10.19 |
| 2004/0109523 A1 | 6/2004 | Singh et al. |
| 2004/0119064 A1 | 6/2004 | Narayan et al. |
| 2004/0127586 A1 | 7/2004 | Jin et al. ........................ 518/715 |
| 2004/0167009 A1 | 8/2004 | Kuntz et al. .................. 501/95.2 |
| 2004/0176246 A1 | 9/2004 | Shirk et al. .................... 502/439 |
| 2004/0208805 A1 | 10/2004 | Fincke et al. |
| 2004/0213998 A1 | 10/2004 | Hearley et al. ................ 428/402 |
| 2004/0238345 A1 | 12/2004 | Koulik et al. |
| 2004/0251017 A1 | 12/2004 | Pillion et al. .................. 165/289 |
| 2004/0251241 A1 | 12/2004 | Blutke et al. |
| 2005/0000321 A1 | 1/2005 | O'Larey et al. ................. 75/952 |
| 2005/0000950 A1 | 1/2005 | Schroder et al. ......... 219/121.59 |
| 2005/0066805 A1 | 3/2005 | Park et al. |
| 2005/0070431 A1 | 3/2005 | Alvin et al. |
| 2005/0077034 A1 | 4/2005 | King ............................. 165/163 |
| 2005/0097988 A1 | 5/2005 | Kodas et al. ................... 75/332 |
| 2005/0106865 A1 | 5/2005 | Chung et al. |
| 2005/0133121 A1 | 6/2005 | Subramanian et al. |
| 2005/0163673 A1 | 7/2005 | Johnson et al. |
| 2005/0199739 A1 | 9/2005 | Kuroda et al. ................... 239/13 |
| 2005/0220695 A1 | 10/2005 | Abatzoglou et al. ........... 423/445 |
| 2005/0227864 A1 | 10/2005 | Sutorik et al. |
| 2005/0233380 A1 | 10/2005 | Pesiri et al. .................... 435/7.1 |
| 2005/0240069 A1 | 10/2005 | Polverejan et al. ............ 585/444 |
| 2005/0258766 A1 | 11/2005 | Kim ......................... 315/111.21 |
| 2005/0275143 A1 | 12/2005 | Toth |
| 2006/0051505 A1 | 3/2006 | Kortshagen et al. ........... 427/212 |
| 2006/0068989 A1 | 3/2006 | Ninomiya et al. ............ 502/339 |
| 2006/0094595 A1 | 5/2006 | Labarge ........................ 502/325 |
| 2006/0096393 A1 | 5/2006 | Pesiri ........................ 73/863.21 |
| 2006/0105910 A1 | 5/2006 | Zhou et al. .................... 502/338 |
| 2006/0108332 A1 | 5/2006 | Belashchenko .......... 219/121.47 |

(56) References Cited

U.S. PATENT DOCUMENTS

| | | | |
|---|---|---|---|
| 2006/0153728 A1 | 7/2006 | Schoenung et al. | 419/32 |
| 2006/0153765 A1 | 7/2006 | Pham-Huu et al. | 423/345 |
| 2006/0159596 A1 | 7/2006 | De La Veaux et al. | 422/151 |
| 2006/0166809 A1 | 7/2006 | Malek et al. | |
| 2006/0222780 A1 | 10/2006 | Gurevich et al. | |
| 2006/0231525 A1 | 10/2006 | Asakawa et al. | 216/56 |
| 2007/0048206 A1 | 3/2007 | Hung et al. | 423/335 |
| 2007/0049484 A1 | 3/2007 | Kear et al. | |
| 2007/0063364 A1 | 3/2007 | Hsiao et al. | 264/5 |
| 2007/0084308 A1 | 4/2007 | Nakamura et al. | 75/346 |
| 2007/0084834 A1 | 4/2007 | Hanus et al. | 219/121.5 |
| 2007/0087934 A1 | 4/2007 | Martens et al. | 502/214 |
| 2007/0163385 A1 | 7/2007 | Takahashi et al. | |
| 2007/0173403 A1 | 7/2007 | Koike et al. | 502/300 |
| 2007/0178673 A1 | 8/2007 | Gole et al. | |
| 2007/0221404 A1 | 9/2007 | Das et al. | |
| 2007/0253874 A1 | 11/2007 | Foret | 422/186.07 |
| 2007/0292321 A1 | 12/2007 | Plischke et al. | 422/198 |
| 2008/0006954 A1 | 1/2008 | Yubuta et al. | |
| 2008/0031806 A1 | 2/2008 | Gavenonis et al. | 423/608 |
| 2008/0038578 A1 | 2/2008 | Li | |
| 2008/0047261 A1 | 2/2008 | Han et al. | |
| 2008/0057212 A1 | 3/2008 | Dorier et al. | |
| 2008/0064769 A1 | 3/2008 | Sato et al. | |
| 2008/0105083 A1 | 5/2008 | Nakamura et al. | 75/255 |
| 2008/0116178 A1 | 5/2008 | Weidman | 219/121.47 |
| 2008/0125308 A1 | 5/2008 | Fujdala et al. | |
| 2008/0125313 A1 | 5/2008 | Fujdala et al. | |
| 2008/0138651 A1 | 6/2008 | Doi et al. | |
| 2008/0175936 A1 | 7/2008 | Tokita et al. | |
| 2008/0187714 A1 | 8/2008 | Wakamatsu et al. | |
| 2008/0206562 A1 | 8/2008 | Stucky et al. | |
| 2008/0207858 A1 | 8/2008 | Kowaleski et al. | |
| 2008/0248704 A1 | 10/2008 | Mathis et al. | |
| 2008/0274344 A1 | 11/2008 | Vieth et al. | 428/304.4 |
| 2008/0277092 A1 | 11/2008 | Layman et al. | 165/281 |
| 2008/0277266 A1 | 11/2008 | Layman et al. | 204/157.15 |
| 2008/0277267 A1 | 11/2008 | Biberger et al. | 204/157.15 |
| 2008/0277268 A1 | 11/2008 | Layman | 204/164 |
| 2008/0277269 A1 | 11/2008 | Biberger et al. | |
| 2008/0277270 A1 | 11/2008 | Biberger | 204/164 |
| 2008/0277271 A1 | 11/2008 | Layman | 422/130 |
| 2008/0280049 A1 | 11/2008 | Kevwitch et al. | 427/243 |
| 2008/0280751 A1 | 11/2008 | Harutyunyan et al. | |
| 2008/0280756 A1 | 11/2008 | Biberger | 502/232 |
| 2008/0283498 A1 | 11/2008 | Yamazaki | |
| 2009/0010801 A1 | 1/2009 | Murphy et al. | 422/4 |
| 2009/0054230 A1 | 2/2009 | Veeraraghavan et al. | |
| 2009/0088585 A1 | 4/2009 | Schammel et al. | 562/409 |
| 2009/0092887 A1 | 4/2009 | McGrath et al. | |
| 2009/0098402 A1 | 4/2009 | Kang et al. | |
| 2009/0114568 A1 | 5/2009 | Trevino et al. | 208/139 |
| 2009/0162991 A1 | 6/2009 | Beneyton et al. | |
| 2009/0168506 A1 | 7/2009 | Han et al. | |
| 2009/0170242 A1 | 7/2009 | Lin et al. | |
| 2009/0181474 A1 | 7/2009 | Nagai | |
| 2009/0200180 A1 | 8/2009 | Capote et al. | |
| 2009/0223410 A1 | 9/2009 | Jun et al. | |
| 2009/0253037 A1 | 10/2009 | Park et al. | |
| 2009/0274903 A1 | 11/2009 | Addiego | 428/337 |
| 2009/0286899 A1 | 11/2009 | Hofmann et al. | 522/99 |
| 2010/0089002 A1 | 4/2010 | Merkel | |
| 2010/0124514 A1 | 5/2010 | Chelluri et al. | |
| 2010/0275781 A1 | 11/2010 | Tsangaris | |
| 2011/0006463 A1 | 1/2011 | Layman | |
| 2011/0052467 A1 | 3/2011 | Chase et al. | |
| 2011/0143041 A1 | 6/2011 | Layman et al. | |
| 2011/0143915 A1 | 6/2011 | Yin et al. | |
| 2011/0143916 A1 | 6/2011 | Leamon | |
| 2011/0143930 A1 | 6/2011 | Yin et al. | |
| 2011/0143933 A1 | 6/2011 | Yin et al. | |
| 2011/0144382 A1 | 6/2011 | Yin et al. | |
| 2011/0152550 A1 | 6/2011 | Grey et al. | |
| 2011/0158871 A1 | 6/2011 | Arnold et al. | |
| 2011/0174604 A1 | 7/2011 | Duesel et al. | |
| 2011/0245073 A1 | 10/2011 | Oljaca et al. | |
| 2011/0247336 A9 | 10/2011 | Farsad et al. | |
| 2012/0045373 A1 | 2/2012 | Biberger | |
| 2012/0097033 A1 | 4/2012 | Arnold et al. | |
| 2012/0122660 A1 | 5/2012 | Andersen et al. | |
| 2012/0171098 A1 | 7/2012 | Hung et al. | |
| 2012/0308467 A1 | 12/2012 | Carpenter et al. | |

FOREIGN PATENT DOCUMENTS

| | | | |
|---|---|---|---|
| JP | 56-146804 | 11/1981 | B22F 9/08 |
| JP | 61-086815 A | 5/1986 | |
| JP | 63-214342 A | 9/1988 | |
| JP | 1-164795 A | 6/1989 | |
| JP | 05-228361 A | 9/1993 | |
| JP | 05-324094 A | 12/1993 | |
| JP | 6-93309 A | 4/1994 | |
| JP | 6-135797 A | 5/1994 | |
| JP | 6-272012 A | 9/1994 | |
| JP | H6-065772 | 9/1994 | |
| JP | 7031873 A | 2/1995 | |
| JP | 07-256116 | 10/1995 | |
| JP | 11-502760 A | 3/1999 | |
| JP | 2000-220978 A | 8/2000 | |
| JP | 2002-336688 A | 11/2002 | |
| JP | 2004-233007 A | 8/2004 | |
| JP | 2004-249206 A | 9/2004 | |
| JP | 2004-290730 A | 10/2004 | |
| JP | 2005-503250 A | 2/2005 | |
| JP | 2005-122621 A | 5/2005 | |
| JP | 2005-218937 A | 8/2005 | |
| JP | 2005-342615 A | 12/2005 | |
| JP | 2006-001779 A | 1/2006 | |
| JP | 2006-508885 A | 3/2006 | |
| JP | 2006-247446 A | 9/2006 | |
| JP | 2006-260385 A | 9/2006 | |
| JP | 2007-46162 A | 2/2007 | |
| JP | 2007-203129 A | 8/2007 | |
| SU | 493241 | 3/1976 | B01J 11/22 |
| TW | 201023207 | 6/2010 | |
| WO | WO-96/28577 A1 | 9/1996 | |
| WO | WO 02/092503 A1 | 11/2002 | C01B 21/064 |
| WO | WO 2004/052778 A2 | 6/2004 | C01B 13/28 |
| WO | WO-2005/063390 A1 | 7/2005 | |
| WO | WO 2006/079213 A1 | 8/2006 | B01J 2/04 |
| WO | WO-2008/130451 A2 | 10/2008 | |
| WO | WO-2008/130451 A3 | 10/2008 | |
| WO | WO-2011/081833 A1 | 7/2011 | |

OTHER PUBLICATIONS

A. Gutsch et al., "Gas-Phase Production of Nanoparticles", Kona No. 20, 2002, pp. 24-37.

Dr. Heike Mühlenweg et al., "Gas-Phase Reactions—Open Up New Roads to Nanoproducts", Degussa ScienceNewsletter No. 08, 2004, pp. 12-16.

Coating Generation: Vaporization of Particles in Plasma Spraying and Splat Formation, M. Vardelle, A. Vardelle, K-I li, P. Fauchais, Universite de Limoges, 123 Avenue A. Thomas 87000, Limoges, F. , Pure & Chem, vol. 68, No. 5, pp. 1093-1099, 1996.

H. Konrad et al. "Nanostructured Cu-Bi Alloys Prepared by Co-Evaporation in a Continuous Gas Flow," NanoStructured Materials, vol. 7, No. 6, 1996, pp. 605-610.

Kenvin et al. "Supported Catalysts Prepared from Mononuclear Copper Complexes: Catalytic Properties", Journal of Catalysis, pp. 81-91, (1992).

J. Heberlein, "New Approaches in Thermal Plasma Technology", Pure Appl. Chem., vol. 74, No. 3, 2002, pp. 327-335.

M.Vardelle et al., "Experimental Investigation of Powder Vaporization in Thermal Plasma Jets," Plasma Chemistry and Plasma Processing, vol. 11, No. 2, Jun. 1991, pp. 185-201.

National Aeronautics and Space Administration, "Enthalpy", http://www.grc.nasa.gov/WWW/K-12/airplane/enthalpy.html, Nov. 23, 2009, 1 page.

P. Fauchais et al., "Plasma Spray: Study of the Coating Generation," Ceramics International, Elsevier, Amsterdam, NL, vol. 22, No. 4, Jan. 1996, pp. 295-303.

(56) References Cited

OTHER PUBLICATIONS

P. Fauchais et al., "Les Dépôts Par Plasma Thermique," Revue Generale De L'Electricitie, RGE. Paris, FR, No. 2, Jan. 1993, pp. 7-12.
P. Fauchais et al, "La Projection Par Plasma: Une Revue," Annales De Physique, vol. 14, No. 3, Jun. 1989, pp. 261-310.
T. Yoshida, "The Future of Thermal Plasma Processing for Coating", Pure & Appl. Chem., vol. 66, No. 6, 1994 pp. 1223-1230.
HANet al., Deformation Mechanisms and Ductility of Nanostructured Al Alloys, Mat. Res. Soc. Symp. Proc. vol. 821, Jan. 2004, Material Research Society, http://www.mrs.org/s_mrs/bin.asp?CID=2670&DOC=FILE.PDF., 6 pages.
Nagai, Yasutaka, et al., "Sintering Inhibition Mechanism of Platinum Supported on Ceria-based Oxide and Pt-oxide-support Interaction,"Journal of Catalysis 242 (2006), pp. 103-109, Jul. 3, 2006, Elsevier.
Derwent English Abstract for publication No. SU 193241 A, Application No. 1973SU1943286 filed on Jul. 2, 1973, published on Mar. 1, 1976, entitled"Catalyst for Ammonia Synthesis Contains Oxides of Aluminum, Potassium, Calcium, Iron and Nickel Oxide for Increased Activity," 3 pgs.
Young, Lee W., Authorized Officer of the International Searching Authority, International Search Report and Written Opinion mailed Apr. 11, 2011, for PCT Application No. PCT/US 10/59763, 7 pgs.
Bateman, J. E. et al. (Dec. 17, 1998). "Alkylation of Porous Silicon by Direct Reaction with Alkenes and Alkynes," Angew. Chem Int. Ed. 37(19):2683-2685.
Carrot, G. et al. (Sep. 17, 2002). "Surface-Initiated Ring-Opening Polymerization: A Versatile Method for Nanoparticle Ordering," Macromolecules 35(22):8400-8404.
Chen, H.-S. et al. (Jul. 3, 2001). "On the Photoluminescence of Si Nanoparticles," Mater. Phys. Mech. 4:62-66.
Fojtik, A. et al. (Apr. 29, 1994). "Luminescent Colloidal Silicon Particles," Chemical Physics Letters 221 :363-367.
Fojtik, A. (Jan. 13, 2006). "Surface Chemistry of Luminescent Colloidal Silicon Nanoparticles," J. Phys. Chem. B. 110(5):1994-1998.
Hua, F. et al. (Mar. 2006). "Organically Capped Silicon Nanoparticles With Blue Photoluminescence Prepared by Hydrosilylation Followed by Oxidation," Langmuir 22(9):4363-4370.
Jouet, R. J. et al. (Jan. 25, 2005). "Surface Passivation of Bare Aluminum Nanoparticles Using Perfluoroalkyl Carboxylic Acids," Chem. Mater.17(11):2987-2996.
Kim, N. Y. et al. (Mar. 5, 1997). "Thermal Derivatization of Porous Silicon with Alcohols," J. Am. Chem. Soc. 119(9):2297-2298.
Kwon, Y.-S. et al. (Apr. 30, 2003). "Passivation Process for Superfine Aluminum Powders Obtained by Electrical Explosion of Wires," Applied Surface Science 211:57-67.
Langner, A. et al. (Aug. 25, 2005). "Controlled Silicon Surface Functionalization by Alkene Hydrosilylation," J. Am. Chem. Soc. 127(37):12798-12799.
Li, D. et al. (Apr. 9, 2005). "Environmentally Responsive "Hairy" Nanoparticles: Mixed Homopolymer Brushes on Silica Nanoparticles Synthesized by Living Radical Polymerization Techniques," J. Am. Chem. Soc. 127(7):6248-6256.
Li, X. et al. (May 25, 2004). "Surface Functionalization of Silicon Nanoparticles Produced by Laser-Driven Pyrolysis of Silane Followed by HF-$HNO_3$ Etching," Langmuir 20(11):4720-4727.
Liao, Y.-C. et al. (Jun. 27, 2006). "Self-Assembly of Organic Monolayers on Aerosolized Silicon Nanoparticles," J.Am. Chem. Soc. 128(28):9061-9065.
Liu, S.-M. et al. (Jan. 13, 2006). "Enhanced Photoluminescence from Si Nano-Organosols by Functionalization With Alkenes and Their Size Evolution," Chem. Mater. 18(3):637-642.
Neiner, D. (Aug. 5, 2006). "Low-Temperature Solution Route to Macroscopic Amounts of Hydrogen Terminated Silicon Nanoparticles," J. Am. Chem. Soc. 128:11016-11017.
Netzer, L. et al. (1983). "A New Approach to Construction of Artificial Monolayer Assemblies," J. Am. Chem. Soc. 105(3):674-676.
"Platinum Group Metals: Annual Review 1996" (Oct. 1997). Engineering and Mining Journal, p. 63.
Sailor, M. J. (1997). "Surface Chemistry of Luminescent Silicon Nanocrystallites," Adv. Mater. 9(10):783-793.
Subramanian, S. et al. (1991). "Structure and Activity of Composite Oxide Supported Platinum-Iridium Catalysts," Applied Catalysts 74: 65-81.
Tao, Y.-T. (May 1993). "Structural Comparison of Self-Assembled Monolayers of n-Alkanoic Acids on the surfaces of Silver, Copper, and Aluminum," J. Am. Chem. Soc. 115(10):4350-4358.
Zou, J. et al. (Jun. 4, 2004). "Solution Synthesis of Ultrastable Luminescent Siloxane-Coated Silicon Nanoparticles," Nano Letters 4(7):1181-1186.
U.S. Appl. No. 13/291,983, filed Nov. 8, 2011, for Layman et al.
U.S. Appl. No. 12/152,084, filed May 9, 2008, for Biberger.
U.S. Appl. No. 13/028,693, filed Feb. 16, 2011, for Biberger.
U.S. Appl. No. 12/943,909, filed Nov. 10, 2010, for Layman.
U.S. Appl. No. 12/152,111, filed May 9, 2008, for Biberger et al.
U.S. Appl. No. 12/151,830, filed May 8, 2008, for Biberger et al.
U.S. Appl. No. 12/968,245, filed Dec. 14, 2010, for Biberger.
U.S. Appl. No. 12/968,241, filed Dec. 14, 2010, for Biberger.
U.S. Appl. No. 12/968,239, filed Dec. 14, 2010, for Biberger.
U.S. Appl. No. 12/969,128, filed Dec. 15, 2010, for Biberger.
U.S. Appl. No. 12/962,463, filed Dec. 7, 2010, for Leaman.
U.S. Appl. No. 12/961,030, filed Dec. 6, 2010, for Lehman.
U.S. Appl. No. 12/961,108, filed Dec. 6, 2010, for Lehman.
U.S. Appl. No. 12/961,200, filed Dec. 6, 2010, for Lehman.
U.S. Appl. No. 12/968,253, filed Dec. 14, 2010, for Biberger.
U.S. Appl. No. 12/968,235, filed Dec. 14, 2010, for Biberger.
U.S. Appl. No. 12/969,306, filed Dec. 15, 2010, for Lehman et al.
U.S. Appl. No. 12/969,447, filed Dec. 15, 2010, for Biberger et al.
U.S. Appl. No. 12/969,087, filed Dec. 15, 2010, for Biberger.
U.S. Appl. No. 12/962,533, filed Dec. 7, 2010, for Yin et al.
U.S. Appl. No. 12/962,523, filed Dec. 7, 2010, for Yin et al.
U.S. Appl. No. 12/001,643, filed Dec. 11, 2007, for Biberger et al.
U.S. Appl. No. 12/474,081, filed May 28, 2009, for Biberger et al.
U.S. Appl. No. 12/001,602, filed Dec. 11, 2007, for Biberger et al.
U.S. Appl. No. 12/001,644, filed Dec. 11, 2007, for Biberger et al.
U.S. Appl. No. 12/969,457, filed Nov. 15, 2010, for Leamon et al.
U.S. Appl. No. 12/969,503, filed Nov. 15, 2010, for Leamon et al.
U.S. Appl. No. 12/954,813, filed Nov. 26, 2010, for Biberger.
U.S. Appl. No. 12/954,822, filed Nov. 26, 2010, for Biberger.
U.S. Appl. No. 13/033,514, filed Feb. 23, 2011, for Biberger et al.
Faber, K. T. et al. (Sep. 1988). "Toughening by Stress-Induced Microcracking in Two-Phase Ceramics," Communications of the American Ceramic Society 71(9): C-399-C401.
Ji, Y. et al. (Nov. 2002) "Processing and Mechanical Properties of Al2O3-5 vol.% Cr Nanocomposites," Journal of the European Ceramic Society 22(12):1927-1936.
Rahaman, R. A. et al. (1995). "Synthesis of Powders," in Ceramic Processing and Sintering. Marcel Decker, Inc., New York, pp. 71-77.
Ünal, N. et al. (Nov. 2011). "Influence of WC Particles on the Microstructural and Mechanical Properties of 3 mol% Y2O3 Stabilized ZrO2 Matrix Composites Produced by Hot Pressing," Journal of the European Ceramic Society (31)13: 2267-2275.
U.S. Appl. No. 12/968,248, filed Dec. 14, 2010, for Biberger.
U.S. Appl. No. 13/589,024, filed Aug. 17, 2012, for Yin et al.
U.S. Appl. No. 13/801,726, filed Mar. 13, 2013, for Qi et al.

PINNING AND AFFIXING NANO-ACTIVE MATERIAL

CROSS REFERENCE TO RELATED APPLICATIONS

This application claims priority under 35 U.S.C. §119(e) to Provisional U.S. Patent Application No. 61/284,329, filed Dec. 15, 2009, and entitled "MATERIAL PROCESSING," which is hereby incorporated by reference.

FIELD OF THE INVENTION

The present invention relates to the field of catalysts. More specifically, the present invention relates to methods of pinning and affixing nano-active material to a nano-support.

BACKGROUND OF THE INVENTION

Catalysts are used to facilitate and speed up a reaction. For example, using well-known methods of wet chemistry to form a catalyst, extrudates are placed in hexachlorplatinic acid ($H_2PtCl_6$). In some embodiments, an extrudate is a cylindrical pellet made by an extrusion process. An example of an extrudate 100 is shown in FIG. 1A. The extrudate 100 is made of or is coated with alumina ($Al_2O_3$) and thus has available oxygen (O) atoms 105 on its surface. As illustrated in FIG. 1B, the platinum (Pt) atoms 115 of the hexachlorplatinic acid 110 are chemically absorbed onto the surface of the alumina. In particular, drying and calcining, such as in an oven, allows the platinum atoms 115 to bond to the oxygen atoms 105, with HCl molecules as byproduct. However, the platinum atoms 115 are not fixed to their bonded oxygen atoms 105 and are able to move around to other available oxygen atoms 105 as illustrated in FIGS. 1C-1D. As the platinum atoms 115 move, the platinum atoms 115 begin to coalesce with other platinum atoms resulting in larger particles 120, as shown in FIG. 1E, and a more energetically favorable state. It is understood that as the platinum particles become larger, it detrimentally affects the ability of the material to act as a catalyst. In high temperature applications, such as in an aged catalytic converting testing, the movement of platinum atoms is magnified. What is needed is an interface and method to prevent the platinum atoms from coalescing.

SUMMARY OF THE INVENTION

In one aspect, an interface for pinning a nano-active material to a nano-support includes a compound configured to limit movement of the nano-active material on a surface of the nano-support. The compound is formed by a reaction of the nano-active material and the surface of the nano-support. In some embodiments, the nano-active material is platinum and the nano-support is alumina. In some embodiments, the nano-support comprises a partially reduced alumina surface. In other embodiments, the compound is a platinum alumina metallic compound. Alternatively, the compound is a platinum copper intermetallic compound.

In another aspect, a pinning method to affix nano-active materials to nano-supports uses a high temperature condensation technology. The high temperature condensation technology is eBeam, microwave, RF or DC plasma. The nano-active materials and the nano-supports are gathered. In some embodiments, starting materials, including a quantity of catalyst material and a quantity of carrier material, are loaded into a chamber. The quantity of catalyst material and the quantity of carrier material are vaporized to create the nano-active materials and the nano-supports. In some embodiments, working gas is supplied to the chamber and energy is delivered to the working gas to form a highly reactive and energetic mixture such that the quantity of catalyst material and the quantity of carrier material are vaporized. In some embodiments, a quantity of copper is also loaded into the chamber to be vaporized.

Metallic properties on surfaces of the nano-supports are then increased. An interface between each nano-active material and a nano-support is formed. The interface is configured to limit movement of the nano-active material on the surface of the nano-support. In some embodiments, each of the plurality of nano-active materials is platinum. In some embodiments, each of the plurality of nano-supports is alumina. In some embodiments, each of the plurality of nano-supports comprises a partially reduce alumina surface. In other embodiments, the interface includes a platinum alumina metallic compound or a platinum copper intermetallic compound.

In yet another aspect, a method of affixing a nano-active material to a nano-support uses high temperature condensation technology to form a layer between the nano-active material and the nano-support material. The high temperature condensation technology is eBeam, microwave, RF or DC plasma. In some embodiments, starting materials, including catalyst material and carrier material, are loaded into a chamber and are vaporized to create the nano-active material and the nano-support. In other embodiments, copper is also loaded into the chamber to be vaporized. Typically, the layer between the nano-active material and the nano-support material is configured to limit movement of the nano-active material on a surface of the nano-support. In some embodiments, the layer includes a platinum alumina metallic compound. Alternatively, the layer includes a platinum copper intermetallic compound.

DETAILED DESCRIPTION OF THE INVENTION

Reference will now be made in detail to implementations of the present invention as illustrated in the accompanying drawings. The drawings may not be to scale. The same reference indicators will be used throughout the drawings and the following detailed description to refer to identical or like elements. In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application, safety regulations and business related constraints, and that these specific goals will vary from one implementation to another and from one developer to another. Moreover, it will be appreciated that such a development effort will be a routine undertaking of engineering for those of ordinary skill in the art having the benefit of this disclosure.

The following description of the invention is provided as an enabling teaching which includes various embodiments. One skilled in the relevant arts, including but not limited to chemistry and physics, will recognize that many changes can be made to the embodiments described, while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations to the embodiments are possible and may even be desirable in certain circumstances, and are a part of the present invention. Thus, the following description is provided as illustrative of the principles of the present invention and not in limitation thereof, since the scope of the present invention is defined by the claims.

Embodiments of the present invention are directed to pinning and affixing nano-active material to nano-support using a high temperature condensation technology. In some embodiments, the high temperature condensation technology is plasma. The high temperature condensation technology can be eBeam, microwave, RF or DC plasma, or any other high temperature condensation technology are possible. Plasma catalyst formed by using the methods described below advantageously has an interface between a nano-active material and a support. As explained in more detail below, the interface dramatically reduces the ability for the nano-active material to move around on the surface of the support, thereby prevent, or at least minimizing, agglomerations of the nano-active material.

Figure 1A:
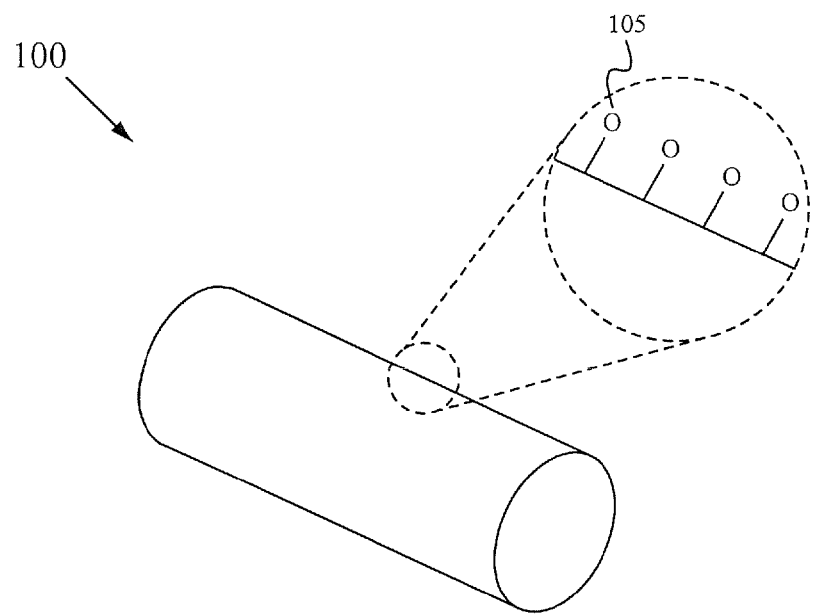
FIGS. 1A-1E illustrate a wet catalyst and its properties in the prior art.
Figure 1B:
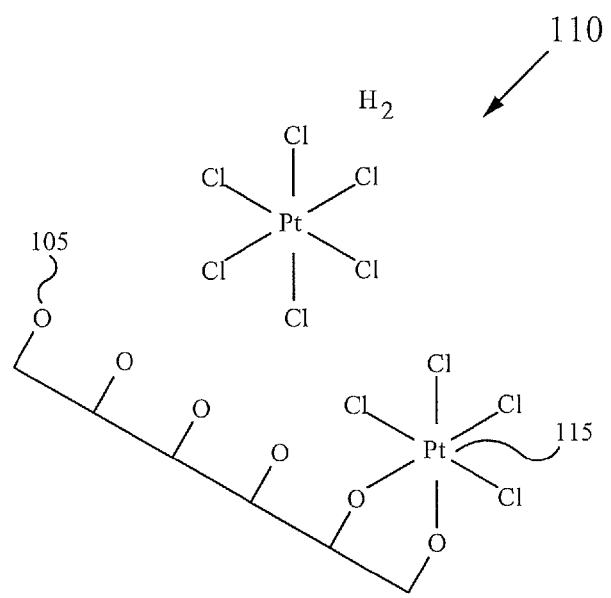
Figure 1C:
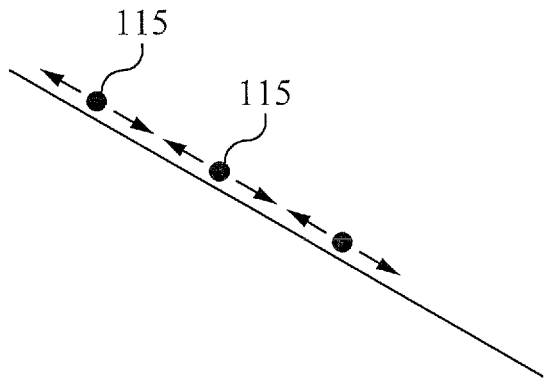
Figure 1D:
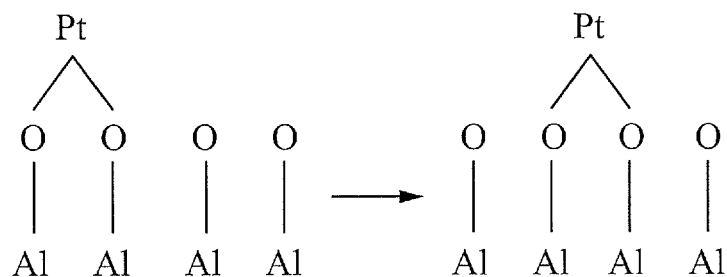
Figure 1E:
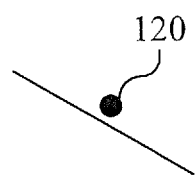
Figure 2:
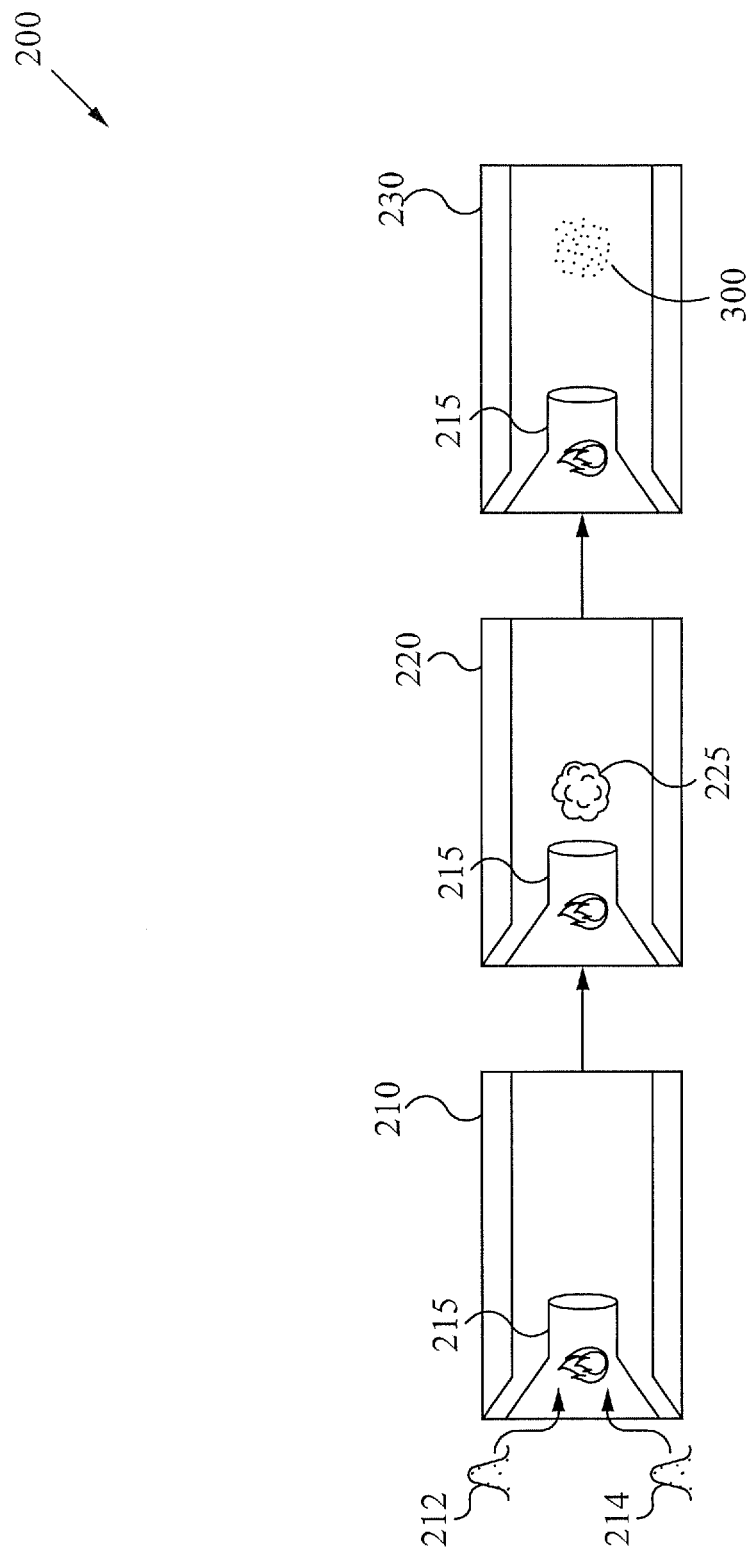
FIG. 2 illustrates a process 200 of pinning and affixing nano-active material to nano-support in accordance with the present invention.

FIG. 2 illustrates a process 200 of pinning and affixing nano-active material to nano-support in accordance with an embodiment of the present invention. At a step 210, starting materials are introduced into a plasma gun. Typically, a quantity of a catalyst material 212 is loaded into a plasma gun 215. Preferably, the catalyst material 212 comprises platinum (Pt), which has excellent catalytic properties. A quantity of carrier material 214 is also loaded into the plasma gun 215. In some embodiments, the carrier material 214 is an oxide such as alumina ($Al_2O_3$). Other useful oxides will be apparent to those of ordinary skill. In some embodiments, the catalyst material 212 and the carrier material 214 are loaded manually into a hopper (not shown), which automatically loads the materials into the plasma gun 215. Alternatively, an automated system is able to load the catalyst material 212 and carrier material 214 into the plasma gun 215. In some embodiments, the starting materials are in powder form when they are loaded into the plasma gun 215. Alternatively, the starting materials are loaded into the plasma gun 215 in other forms (e.g., wire, liquid and gas) are contemplated. It should be understood to one skilled in the art that the ratio of the catalyst material 212 to the carrier material 214 can be adjusted to meet particular demands of a given application. Typically, the quantity of the carrier material 214 is much greater than the quantity of the catalyst material 212.

Next, at a step 220, the plasma gun 215 vaporizes the catalyst material 212 along with the carrier material 214 to form a vapor cloud 225. In some embodiments, working gas is introduced into the plasma gun, while energy is supplied to the working gas to create plasma. A variety of different means can be employed to deliver this energy, including, but not limited to, DC coupling, capacitive coupling, inductive coupling, and resonant coupling. The combination within the plasma gun 215 of the plasma and the materials forms a highly reactive and energetic mixture, wherein the materials can be vaporized. The vapor cloud 225 comprises both vaporized catalyst material and vaporized carrier material in the ratio that was loaded into the plasma gun 215 at the step 210.

Figure 3A:
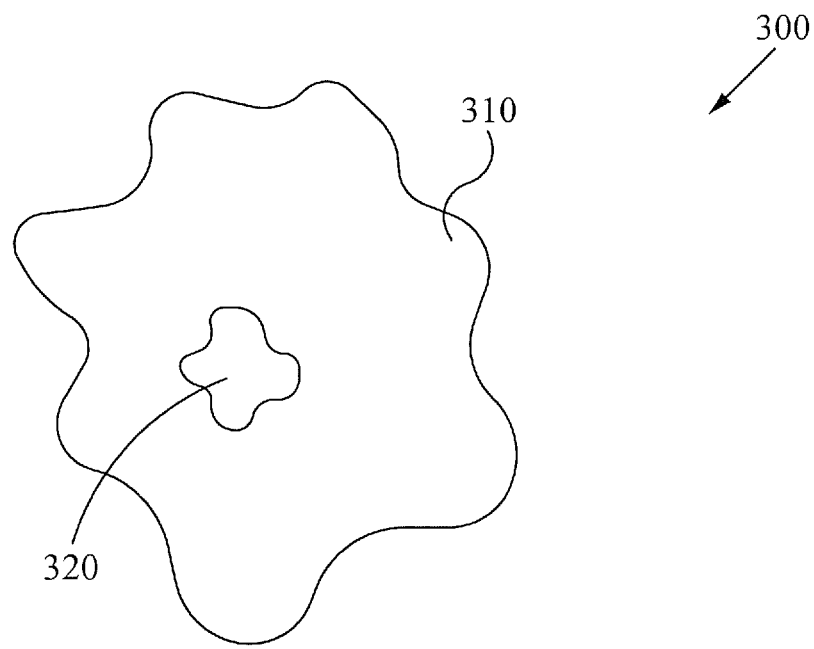
FIGS. 3A-3B illustrate a nanoparticle in accordance with the present invention.

Still referring to FIG. 2, the resulting vapor cloud 225 is then put through a quenching step 230. Preferably, the quenching step occurs in a highly turbulent quench chamber to facilitate rapid, even, consistent quenching of the vapor 225 into precipitate nanoparticles 300. As the catalyst material 212 and carrier material 214 cool, they solidify into nanoparticles 300. An example of a resulting nanoparticle 300 is shown in FIG. 3A. As shown, the nanoparticle 300 comprises a nano-active material 320 and a nano-support 310. In some embodiments, the nano-active material 320 is a gaseous platinum atom, and the nano-support 310 is some form of alumina, such as aluminum (Al) plus oxygen (O).

Specifically, the vaporizing and quenching is performed in reducing conditions using plasma from argon $H_2$. As the vapor 225 quenches, the catalyst material 212 starts to cool down to form nano-active material 320 during quenching. Meanwhile, the carrier material 214 forms into a nano-support 310 with a partially reduced alumina surface, resulting in a more metallic and less oxygen-rich surface. At the surface, the partially reduced alumina is of $Al_2O_{3-x}$, wherein x is an integer that ranges from zero to three.

Generally the ratio of the nano-active materials 320 and the nano-supports 310 is determined by the ratio of the starting quantities of the catalyst material 212 and carrier material 214 in step 210 of FIG. 2. As such, there are many more nano-supports 310 than there are nano-active materials 320. Although nano-active materials 320 are able to collide with other nano-active materials 320, the chances are greater that the nano-supports 310 collide with other nano-supports 310. The next most likely occurrence are the nano-active materials 320 colliding with the nano-supports 310, resulting in nano-particles 300.

Figure 3B:
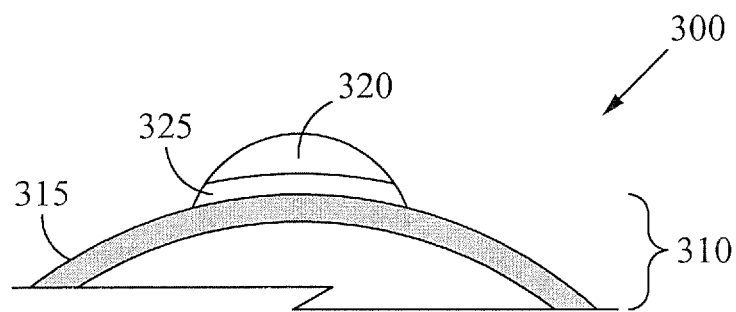

FIG. 3B illustrates a cross-sectional view of the nanoparticle 300. Since the surface of the nano-support 310 is partially reduced alumina, the nano-active material 320 reacts with the aluminum metal (more so than with the aluminum oxide). As such, when a nano-active material 320 attaches to the surface 315 of a nano-support 310, an interface 325 is formed by the reaction of the nano-active material 320 and the partially reduced alumina. In some embodiments, the interface 325 thereby comprises a platinum alumina metallic compound ($Pt_aAl_b$). The platinum alumina metallic compound changes dramatically the ability for the nano-active material 320 to move around on the surface 315 of the nano-support 310. Consequently, the nano-active material 320 strongly attaches to the nano-support 310, preventing the movement and coalescing/conglomeration of the nano-active material 320 on the surface of the nano-support 310. In contrast to the plasma catalyst of the present invention, nano-active materials of a wet catalyst formed using wet chemistry are free to move and conglomerate. As discussed above, the prevention of movement and coalescing/conglomeration is of great benefit in high temperature applications such as in an aged catalytic converting testing.

When using wet chemistry to form a wet catalyst, a problem arises in high temperature applications, such as in the aged catalytic converting testing in which the temperature was raised to 800° C. The degree of platinum conglomeration in the wet catalyst was magnified compared to that of fresh catalytic converting testing, whereas the difference between conglomerations in aged and fresh catalytic converting testing was much lower in the plasma catalyst. This was true when the testing is done in both reducing and oxidation conditions. The increase in the amount of conglomeration of the aged plasma catalyst raised to 800° is equivalent to the amount of the wet catalyst raised to only 20° to 50° C.

Figure 4:
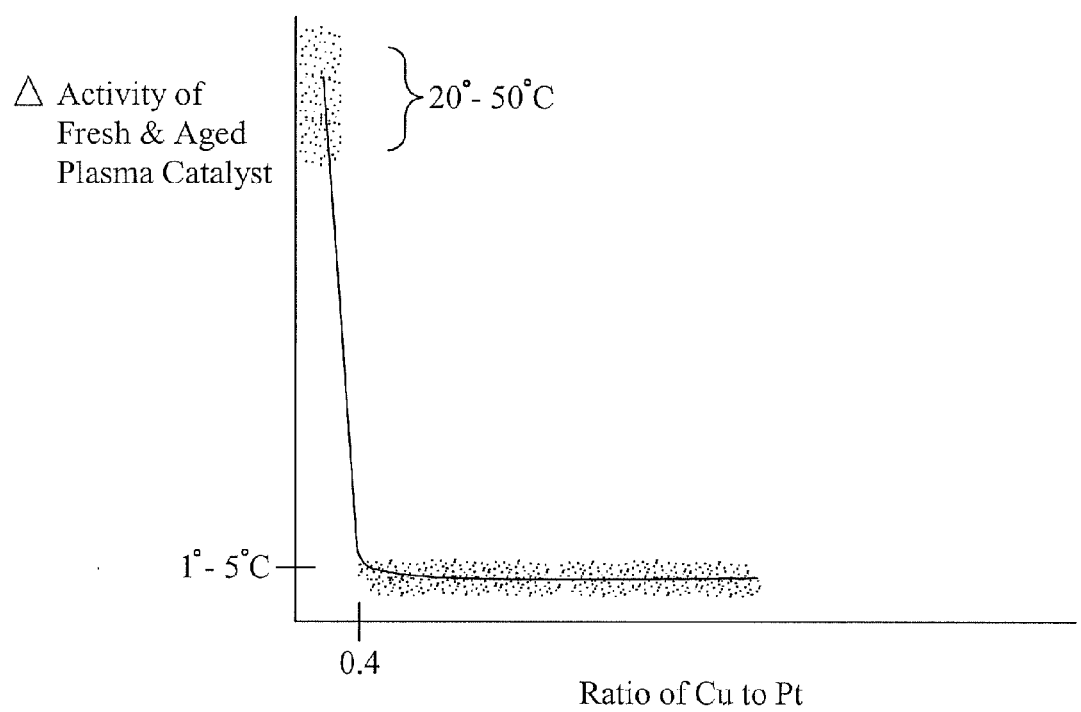
FIG. 4 illustrates a graph of difference of activity of fresh and aged plasma catalysts versus a ratio of copper to platinum in the plasma catalyst.

In some embodiments, the effectiveness and activity of the plasma catalyst is further improved by adding a quantity of copper (Cu) into the plasma gun 215 along with the other starting materials 212, 214. FIG. 4 illustrates a graph of difference of activity of fresh and aged plasma catalysts versus a ratio of copper to platinum in the plasma catalyst. With a certain copper to platinum ratio, typically 0.4, in the plasma catalyst, an increase in conglomeration is even lower, typically equivalent to only a 1° C. to 5° C. raise in the wet catalysts. When copper is added, the interface between the nano-active material 320 and the surface 315 of the nano-support 310 comprises a platinum copper intermetallic compound (IMC), which consequently provides a better bond than an interface containing a platinum alumina metallic compound since the tendency of platinum atoms to skip over to an available oxygen atom is further reduced.

The present invention has been described in terms of specific embodiments incorporating details to facilitate the understanding of principles of construction and operation of the invention. Such reference herein to specific embodiments and details thereof is not intended to limit the scope of the claims appended hereto. A person skilled in the art would appreciate that various modifications and revisions to the pinning and affixing nano-active material. Consequently, the claims should be broadly construed, consistent with the spirit and scope of the invention, and should not be limited to their exact, literal meaning.

We claim:

1. An interface on a plasma generated particle for pinning nano-active material to a nano-support comprising a compound configured to limit movement of the nano-active material on a surface of the nano-support, wherein the nano-support comprises a partially reduced alumina surface and wherein the compound is formed by a reaction of the nano-active material and the surface of the nano-support, and the movement to be limited is based on physical movement of the nano-active material from one site on the surface to another site on the surface.

2. The interface of claim 1 wherein the nano-active material comprises platinum.

3. The interface of claim 1 wherein the compound is a platinum alumina metallic compound or a platinum copper intermetallic compound.

4. A pinning method to affix nano-active materials to nano-supports by using a high temperature condensation technology comprising:
   a. gathering the nano-active materials and the nano-supports;
   b. increasing metallic content on surfaces of the nano-supports by reducing the nano support material; and
   c. forming an interface on a plasma generated particle between each nano-active material and a nano-support, wherein the interface is configured to limit movement of the nano-active material on the surface of the nano-support, and the movement to be limited is based on physical movement of the nano-active material from one site on the surface to another site on the surface.

5. The pinning method of claim 4 wherein the high temperature condensation technology is E-Beam, microwave, RF or DC plasma.

6. The pinning method of claim 4 wherein the gathering includes:
   a. loading a quantity of catalyst material and a quantity of carrier material into a chamber; and
   b. vaporizing the quantity of catalyst material and the quantity of carrier material, thereby creating the nano-active materials and the nano-supports.

7. The pinning method of claim 6 wherein the vaporizing includes:
   a. supplying working gas into the chamber; and
   b. delivering energy to the working gas.

8. The pinning method of claim 6 wherein the gathering further includes loading a quantity of copper into the chamber.

9. The pinning method of claim 4 wherein each of the plurality of nano-active materials comprises platinum.

10. The pinning method of claim 4 wherein each of the plurality of nano-supports is alumina.

11. The pinning method of claim 4 wherein each of the plurality of nano-supports comprises a partially reduced alumina surface.

12. The pinning method of claim 11 wherein the interface comprises a platinum alumina metallic compound or a platinum copper intermetallic compound.

13. A method of affixing a nano-active material to a nano-support comprising using high temperature condensation technology to form a layer between the nano-active material and the nano-support material on a plasma generated particle and increasing metallic content on surfaces of the nano-supports by reducing the nano support material so that movement of the nano-active material on a surface of the nano-support is limited and the movement to be limited is based on physical movement of the nano-active material from one site on the surface to another site on the surface.

14. The method of claim 13 wherein the high temperature condensation technology is E-Beam, microwave, RF or DC plasma.

15. The method of claim 13 wherein the using of high temperature condensation technology comprises:
   a. loading catalyst material and carrier material into a chamber; and
   b. vaporizing the catalyst material and the carrier material to create the nano-active material and the nano-support.

16. The method of claim 15 wherein the using of high temperature condensation technology further comprises loading copper into the chamber.

17. The method of claim 13 wherein the layer is configured to limit movement of the nano active material on a surface of the nano-support.

18. The method of claim 17 wherein the layer comprises a platinum alumina metallic compound or comprises a platinum copper intermetallic compound.

* * * * *

UNITED STATES PATENT AND TRADEMARK OFFICE
CERTIFICATE OF CORRECTION

PATENT NO. : 8,652,992 B2
APPLICATION NO. : 12/962473
DATED : February 18, 2014
INVENTOR(S) : Yin et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 80 days.

Signed and Sealed this
Twenty-first Day of July, 2015

Michelle K. Lee
*Director of the United States Patent and Trademark Office*